(No Model.) 10 Sheets—Sheet 1.
J. A. COLEMAN.
MACHINE FOR MAKING HORSESHOE NAILS.
No. 531,161. Patented Dec. 18, 1894.

Fig. 1.

Attest:
Philip F. Larner
Nowell Batte

Inventor:
John Addison Coleman
By [signature]
Attorney.

(No Model.)  10 Sheets—Sheet 2.

J. A. COLEMAN.
MACHINE FOR MAKING HORSESHOE NAILS.

No. 531,161.  Patented Dec. 18, 1894.

(No Model.) 10 Sheets—Sheet 3.
J. A. COLEMAN.
MACHINE FOR MAKING HORSESHOE NAILS.

No. 531,161. Patented Dec. 18, 1894.

(No Model.) 10 Sheets—Sheet 4.
J. A. COLEMAN.
MACHINE FOR MAKING HORSESHOE NAILS.
No. 531,161. Patented Dec. 18, 1894.

(No Model.) 10 Sheets—Sheet 6.

J. A. COLEMAN.
MACHINE FOR MAKING HORSESHOE NAILS.

No. 531,161. Patented Dec. 18, 1894.

Fig. II.

Attest:
Philip F. Larner
Howell Battle

Inventor:
John Addison Coleman
By
Attorney (No Model.) 10 Sheets—Sheet 9.
J. A. COLEMAN.
MACHINE FOR MAKING HORSESHOE NAILS.

No. 531,161. Patented Dec. 18, 1894.

Fig. 16.

Attest:
Philip F. Larner
Howell Battle

Inventor:
John Addison Coleman
By
Attorney (No Model.) 10 Sheets—Sheet 10.

J. A. COLEMAN.
MACHINE FOR MAKING HORSESHOE NAILS.

No. 531,161. Patented Dec. 18, 1894.

Attest:
Philip F. Larner
Nowell Battle

Inventor:
John Addison Coleman
By [signature]
Attorney

UNITED STATES PATENT OFFICE.

JOHN ADDISON COLEMAN, OF PROVIDENCE, RHODE ISLAND.

MACHINE FOR MAKING HORSESHOE-NAILS.

SPECIFICATION forming part of Letters Patent No. 531,161, dated December 18, 1894.

Application filed June 16, 1890. Serial No. 355,623. (No model.)

*To all whom it may concern:*

Be it known that I, JOHN ADDISON COLEMAN, of the city and county of Providence and State of Rhode Island, have invented certain new and useful Improvements in Machines for Making Horseshoe-Nails; and I do hereby declare that the following specification, taken in connection with the drawings furnished and forming a part of the same, is a clear, true, and complete description of the several features of my invention.

My said improvements pertain generally to that well known type of nail machines, which embody one or more sets of die rolls, by means of which suitable blanks are progressively acted upon, for developing the heads into true form, and for drawing out the shanks and developing them as to length and form; and certain portions of my improvements, more particularly relate to such machines as perform the final die rolling operation, and still other portions of my improvements relate to developing the sharp points of nails, after the said final die rolling operation.

It is well known that the die rolls referred to, operate on what is termed the "back rolling" principle in that a blank or partially finished nail, must be presented head first to the rolls, and either edgewise or flatwise, depending in each instance, upon whether the rolls operate upon the sides, or on the edges of the shanks. It is also well known, that the terminal or final set of rolls, mainly develop the nail points, to the extent of sharply and clearly defining the lines, at and adjacent to the tip of the point, but with a flat thin web of displaced extraneous metal, which must be wholly removed, by means of cutting or punching dies for finally developing the point, and thereby finishing the nail. This final point trimming operation, has, I believe, presented more vexatious and obstructive difficulties than have been heretofore encountered, in any one operation in this art. It will be readily understood that these webs must vary more or less in their dimensions as to outline and width according to the excess of metal adjacent to the rolled point, in each instance, beyond that quantity actually required for developing a perfect nail point, but such webs when detached, are forked and always have an interior contour corresponding to the edge lines of the finished nail at and adjacent to its point. Notwithstanding the seeming insignificance of these detached webs, they have heretofore proved to be exceedingly mischievous, troublesome and expensive, in that they more or less frequently so far cripple a machine, as to involve costly repairs, and loss in productive time by the machine. These webs have heretofore been dangerous, because the cutting die and its plunger, have always heretofore been so organized, that after each web has been detached from the nail, it is carried upon, or rides upon the upper edge of the reciprocating plunger, and when a row of the webs is being thus carried, the one last cut is ever liable to drop from the end of the plunger and to get caught between the plunger, and a webbed nail just presented to the die, causing the defacement of the plunger, or the die, or both, with more or less liability of breakage and damage to adjacent portions of the machine. Various brushing or clearing devices have heretofore been tried, with a view to obviating these difficulties, but with unsatisfactory results, because lubricating matter must be freely used on the dies, which frequently causes the webs to adhere to the front end of the plunger, when displaced and dropped from the riding edge. The carrying of the webs by the plunger, has been heretofore considered by me, and by others, as a necessary evil, because as I have before stated, the nails are delivered to, and therefore from, the terminal die rolls, head first, thus locating the point upward, when presented as heretofore to the cutting or point trimming die, and leaving the $\wedge$ shaped webs riding upon the sharp upper edge of the reciprocating plunger.

The prime object of one portion of my present invention is to render the detached webs absolutely harmless, and I do this by so disposing of each web, in the matter of its position, that it can in no manner interfere with the proper operation of the plunger and die, whether the webs be promptly dropped, or adhere to the plunger. In other words, I have as I believe for the first time, successfully so arranged the die, and its plunger, that the point cutting portions occupy a plane below that portion of the die through which the heads of the nails pass, each nail being fed to, and held in front of the trimming die, head upward, and with the shank and web, at least so far in a pendent position, that a detached web may freely drop from the plunger; or so that even if the webs should for a while adhere to the lower sharp edge of the plunger, they could not in falling therefrom, get caught between the end of the plunger, and a webbed nail in position for having its point trimmed. Inasmuch as the terminal die rolls drop the nails head first, and the nails must be delivered to the trimming die point first, I have also for the first time organized with such terminal die rolls, and with the point trimming die, intermediate mechanism for individually turning the webbed nail blanks, end for end, and for directly delivering them to the trimming die, and properly holding them in a pendent and proper position, during the operation of the plunger. This intermediate mechanism, may be quite widely varied in the matter of detail, and I have devised and employed several forms thereof, involving unimportant variations in the mode of controlling the webbed nails, in their passage from the die rolls to their proper position in front of the trimming die, but all of them essentially embody means for directly reversing the webbed nail end for end, and means for firmly and accurately supporting and holding it by the head, with the web downward.

It is not new to employ in front of the die, a rotative carrier provided at its periphery with radial slots for the reception of the heads of webbed nails, as delivered from the rolls. In such prior organization, the several nails carried by the holder, were gradually inverted in position, and placed one by one in front of the die, but depending for accuracy upon the well known uncertain operation of a pawl and ratchet, the teeth of the latter being liable to clogging, as from oil and dirt, or other bulky matter; whereas in my machine each webbed nail is directly and separately reversed, and presented at once to the die, under practically non variable conditions, and with consequent safety to the die.

Other portions of my invention, relate to mechanism for separating the nail blanks, or partly finished nails from a mass, and feeding or delivering them to die rolls one by one, in a certain precise arrangement as to endwise and axial position, whether the rolls operate initially upon the blanks, or finally, or intermediately, and in this connection I will refer to my Letters Patent No. 396,467, dated January 22, 1889, wherein certain features of invention are shown, described, and claimed, which are still employed by me, in connection with feeding the nail blanks.

After describing the mechanism illustrated in the drawings, the features already referred to, and certain others deemed novel, will be specified in the several clauses of claims hereunto annexed.

Referring to the drawings, of which there are ten sheets.

Figures 2, 3, 4:
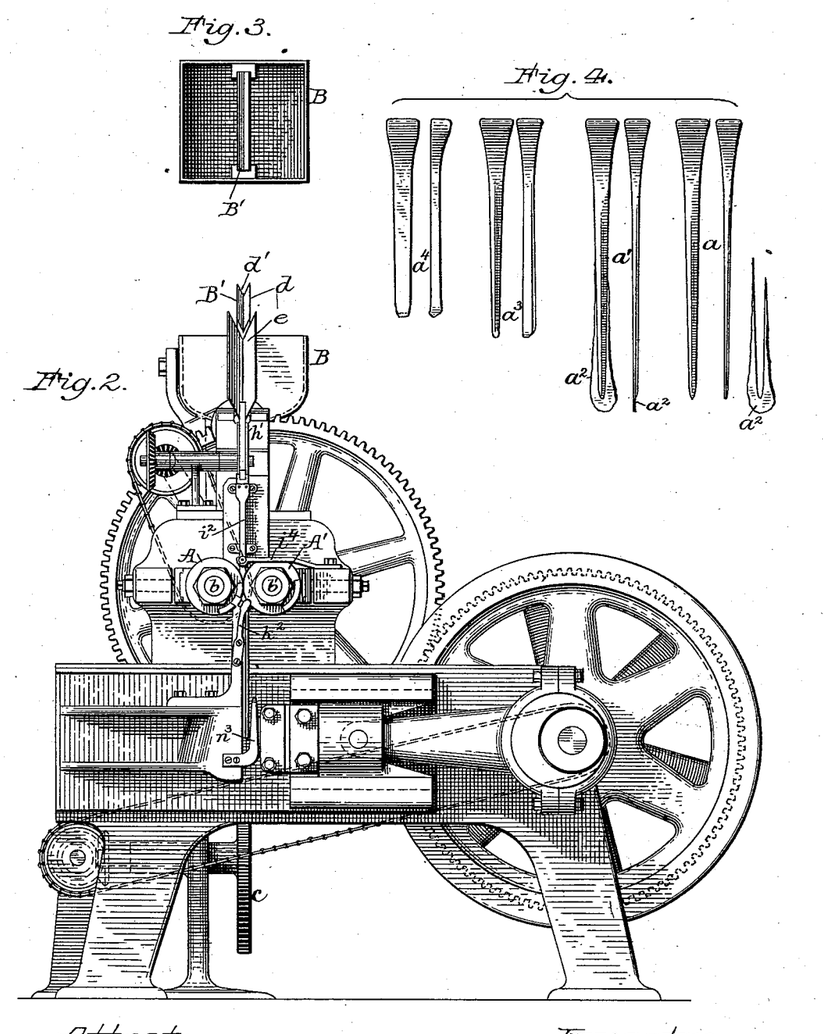
Fig. 2, is a front elevation of said machine.
Fig. 3, is a plan view of the hopper or receptacle which is supplied with blanks in mass.
Fig. 4, illustrates blanks, a detached web, and a finished nail, each being shown in side and edge views.

Before describing the mechanism, I will refer to Fig. 4, which illustrates a finished nail $a$, as now produced by me from the webbed blank $a'$, which is developed by the terminal rolls. The web $a^2$, is detached from said blank $a'$, by the trimming die. The nail blank $a^3$, is as when fed to the terminal rolls. The blank $a^4$, may be considerably varied in form, and it may be initially developed, either by cutting operations, as from specially rolled plate, or bar metal, or by upsetting or heading operations as from suitable rods or wire. The machine now illustrated by me, has but one set of rolls, and they perform the terminal rolling operation. The changing of the blank $a^4$, to $a^3$, is performed preferably in a separate machine, although I have machines, in which the two sets of rolls are successfully employed.

It will be seen, that in automatically feeding such blanks as $a^3$, and $a^4$, one by one, from a mass of them to a set of rolls, reliance must be had, upon arranging them in line, in a pendent position, and standing edgewise to each other, all as fully described in my Letters Patent No. 396,467, dated January 22, 1889. After the terminal rolls have operated in changing a blank $a^3$, to blank $a'$, with its web $a^2$, fully developed, it is obvious that said webbed blank must be always presented to a trimming die, with the flat side of the webbed tip, farthest from the face of the trimming die, in order that the developed portion of the shank and tip, may partially enter the die, and enable the face of a plunger to engage with the flat side of the blank at the web. In other words, while blanks may be arranged in a line for automatic feeding to the terminal rolls, or to any other preceding them, in order of operation, regardless of whether corresponding sides of the blanks always face in one direction, the conditions are changed after the terminal rolls have operated, because of the presence of the flat web, which requires a certain precise flatwise arrangement of the webbed blank, with reference to the face of the trimming die. The webbed blanks will therefore be either fed to the die singly, and by hand, or automatically and singly, from the terminal rolls, because when the webbed blanks leave the rolls, the flat sides of the webs always face in one direction, and whether the point trimming be done in the machine which contains the terminal rolls, or in a separate machine to be automatically fed, the rolls must be relied upon, for automatically effecting an initial precise arrangement of the blanks, and thereafter the blanks must be controlled with strict reference to maintaining their precise axial adjustment, so as to prevent the flat side of the webbed blank from facing, the face of the trimming die.

Figure 1:
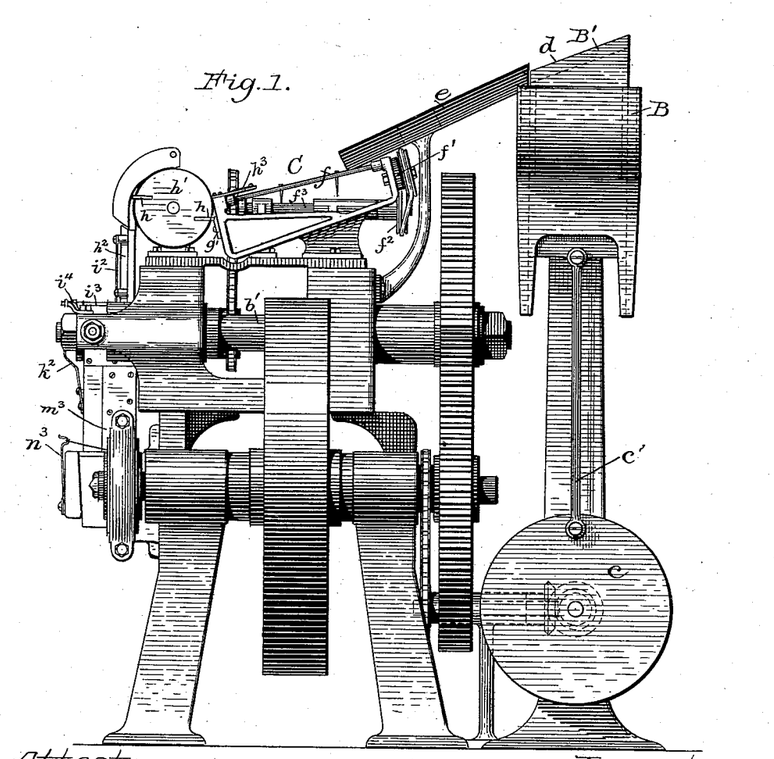
Figure 1, is a side elevation of a machine embodying my invention in what I now deem its best form.

Referring now to Figs. 1 and 2, it is to be understood that the die rolls A, and A', their shafts $b$, and $b'$, and their gearing, are all substantially as heretofore.

The mechanism, by means of which the blanks (which are supplied in mass to the pan or "hopper" B), are separated, arranged and fed singly to the rolls, involves several important novel features.

Commencing with the hopper or pan B, it will be seen that it is slotted at the bottom to accommodate the separator B', which is vertically reciprocated, by means of the revolving plate wheel $c$, and link $c'$, Fig. 1.

The separator, is a block or plate of considerable thickness, and its upper edge $d$, is inclined downwardly from its outer corner, and is grooved at $d'$ so that as it rises through a mass of blanks, more or less of them will occupy and lie lengthwise in its shallow groove, and be lifted above the top of the mass, and be retained in the groove, until the lower corner of the separator passes above the top of the pan; whereupon the blanks will slide endwise downwardly and out of the groove. As shown in the drawings, this groove $d'$, is V-shaped, and this form is of consequence, if the blanks are to be delivered directly from the separator to a slotted raceway in which the blanks are to be arranged in pendent position, edge to edge, but if an intermediate V-shaped chute $e$, is employed, the groove in the separator may be of any other form, because the chute will deliver the blanks to the raceway, so nearly edgewise, that the shanks will readily drop into the slot of the raceway.

The V shaped chute $e$, is slotted or grooved, at its lower end as described in my aforesaid Patent No. 396,467, and it projects over and upon the present raceway C, with the slot or groove in the chute registering with the slot or space between the rails of the raceway, so that as blanks slide down the chute from the separator, their shanks drop edgewise through the slot in the chute, and thence through the raceway, upon which the blanks are supported by their heads, as indicated in dotted lines.

The raceway C, has two rotative inclined rails $f, f$, clearly shown in Figs. 5 to 8 inclusive. Said rails are round rods, fully journaled at their upper ends, and geared together, power being applied thereto, by a pinion $f'$, and a pulley belted from another pulley $f^2$, on a shaft $f^3$ driven by a sprocket chain from one of the die roll shafts. At their lower ends, the rails are each provided with a journal box $f^4$, open at one side, thus providing for a continuation of the required space or slot essential in a raceway, for carrying nail blanks in a pendent position.

Figure 5:
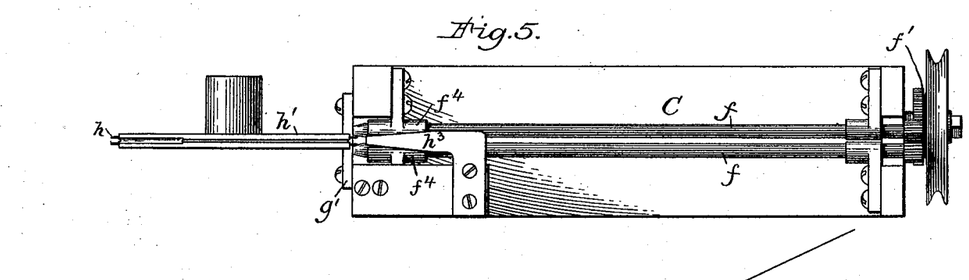
Figs. 5 and 6, respectively illustrate in plan and side view, an improved raceway, and the driving wheel by which nail blanks are presented to the rolls.
Figure 7:
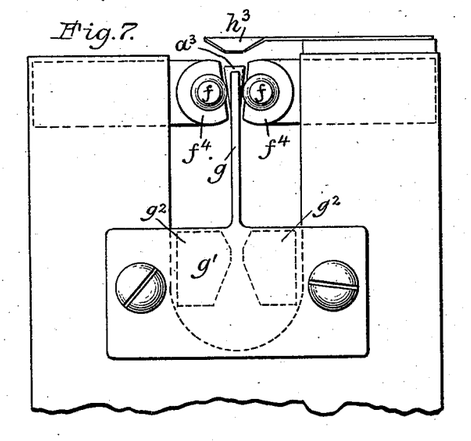
Figs. 7 and 8, illustrate the delivery end of said raceway, with a nail blank in position for delivery.
Figure 8:
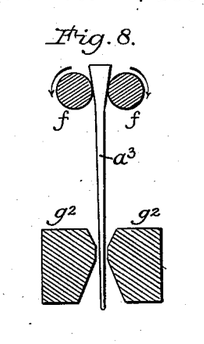
Figure 9:
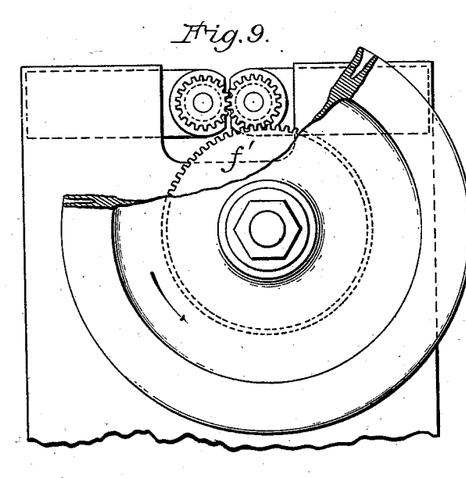
Fig. 9, illustrates the receiving end of said raceway and its gearing.

The tips of the rails or rods, at their lower ends, are slightly tapered, thus in effect, widening the slot at its lower end, as clearly shown in Figs. 5 and 7. The inclined sides of the heads of the blanks, are conducive to a wedging effect, and to a consequent failure of movement by the blanks in raceways as heretofore constructed, but with these rotative rails, the contact surfaces are always moving upwardly, or outwardly as indicated by arrows, and hence there is a slight lifting action upon a blank, permitting it to pass with absolute certainty, to the foot of the slot, even when the raceway is slightly inclined. Although I prefer that said raceway be more or less inclined, the rotation of the rods renders but little inclination necessary, and if said rods be lightly scored or roughened spirally, they will operate with great accuracy when not inclined at all.

Figure 6:
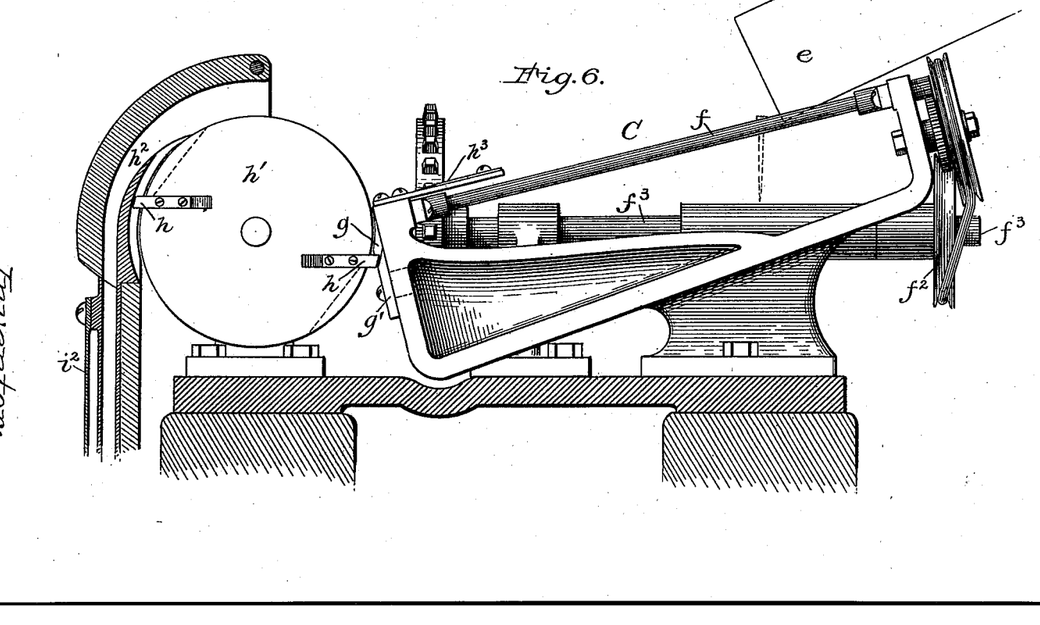

At the foot of the raceway, a stop or guard $g$, is employed for so closing the end of the slot, that blanks can proceed no farther than to the tapered ends of the rails, as clearly indicated in Figs. 6 and 7. Said stop or guard, is a vertical finger projecting from a base plate $g'$, secured to an adjacent portion of the raceway frame, and on the rear side of said plate, there are two rearwardly projecting guide blocks $g^2$, $g^2$, Figs. 7 and 8, separated by a space in line with the raceway slot, for occupation by the lower ends of the blanks, and maintaining the latter in a truly vertical position when at the foot of the raceway. The width of the guard $g$, is no greater, and may be less, than the thickness of a blank immediately below its head, and hence spaces are afforded between the guard and the tapered ends of the rails $f, f$, for enabling the passage of fingers for lifting a blank from the slot. This lifting action is performed by diving fingers as disclosed in my Letters Patent No. 396,467, said fingers $h$, being here shown as carried by a disk or wheel $h'$, which is slowly rotated by bevel gearing from the shaft $f^3$. Each revolution of the disk, causes its two sets of fingers $h$, to respectively engage with a blank, lift it from the raceway by its head, and to carry it over to the open top of the feed tube $h^2$, and deliver it therein, head first. For preventing the vertical displacement of any but the lowest blank in the chute, a cap plate $h^3$, loosely overlies a portion of the lower end of the raceway, as clearly indicated in Figs. 5, 6, and 7. In the event of occasional diversions of blanks in passing to the raceway, the blanks will drop to an inclined surface below the rails, from which they can be delivered into a box for replacement in the hopper or pan. The feed tube is of such form and dimensions, that it freely receives the head of a blank, and when said tube leads to terminal rolls, the blank may be presented to the rolls, without any variation in axial adjustment; but when fed to preliminary rolls for working the edges of the shanks, the blanks can be axially rotated, a quarter turn, by means of a twist in the feed tube, in a manner well known.

It will be obvious, that the raceway composed of rotative rails may be employed with other forms of receptacles for the mass of blanks, and with other forms of separators, such for instance as involve the use of endless belts, as described in my aforesaid Letters Patent. Having reference to effective simplicity, however, the vertically reciprocating separator constitutes a valuable improvement in combination with a raceway, and a driving wheel, for separating and feeding horseshoe nail blanks.

The feed tube $h^2$, immediately above the rolls is provided with an inwardly projecting finger $i$, which, as heretofore, arrests the descent of a blank, and then releases it, at the proper moment for allowing it to drop to the rolls. Said finger $i$, is mounted upon the lower end of a pendent spring $i^2$, which is connected by an adjustable rod $i^3$, with a horizontal lever $i^4$, pivoted at its rear end, and engaged at the proper moment by a cam $i^5$, on the end of the shaft of one of the rolls, all as clearly indicated in Figs. 10, 11 and 12.

Figure 10:
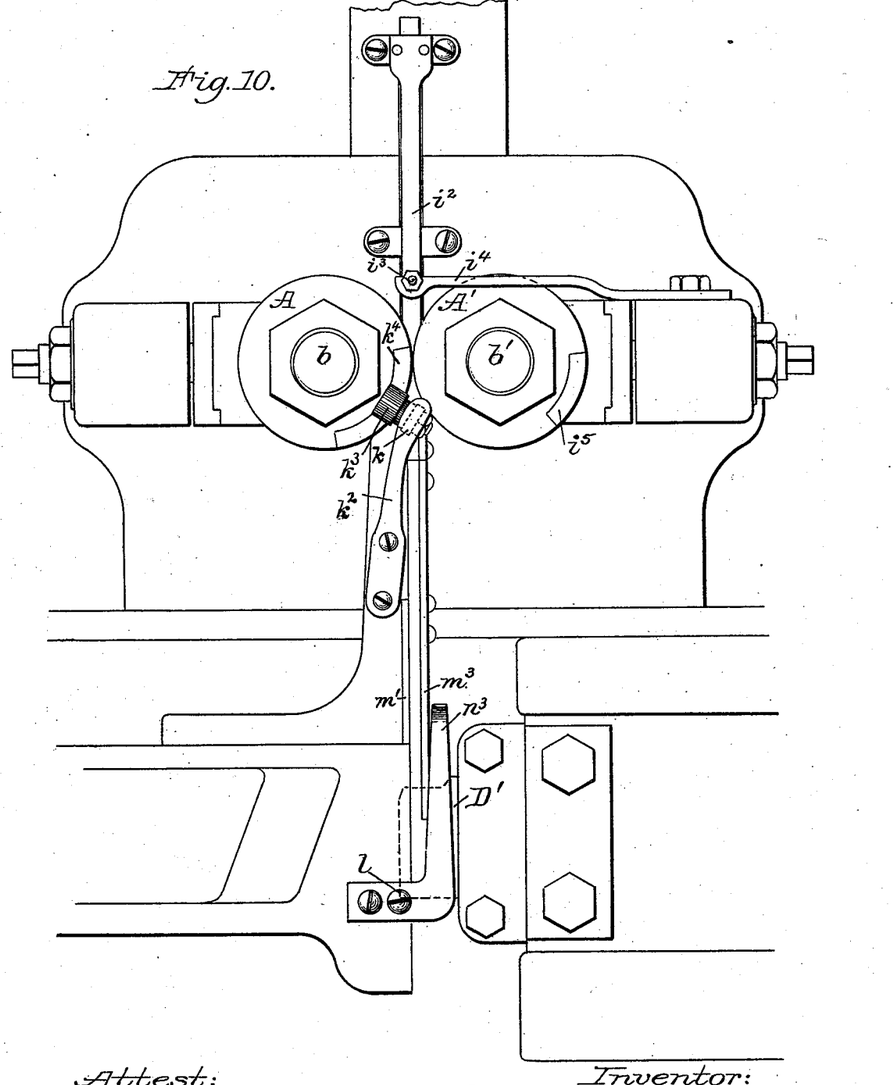
Fig. 10, on an enlarged scale, illustrates the lower portion of the machine in front view.
Figures 12, 13:
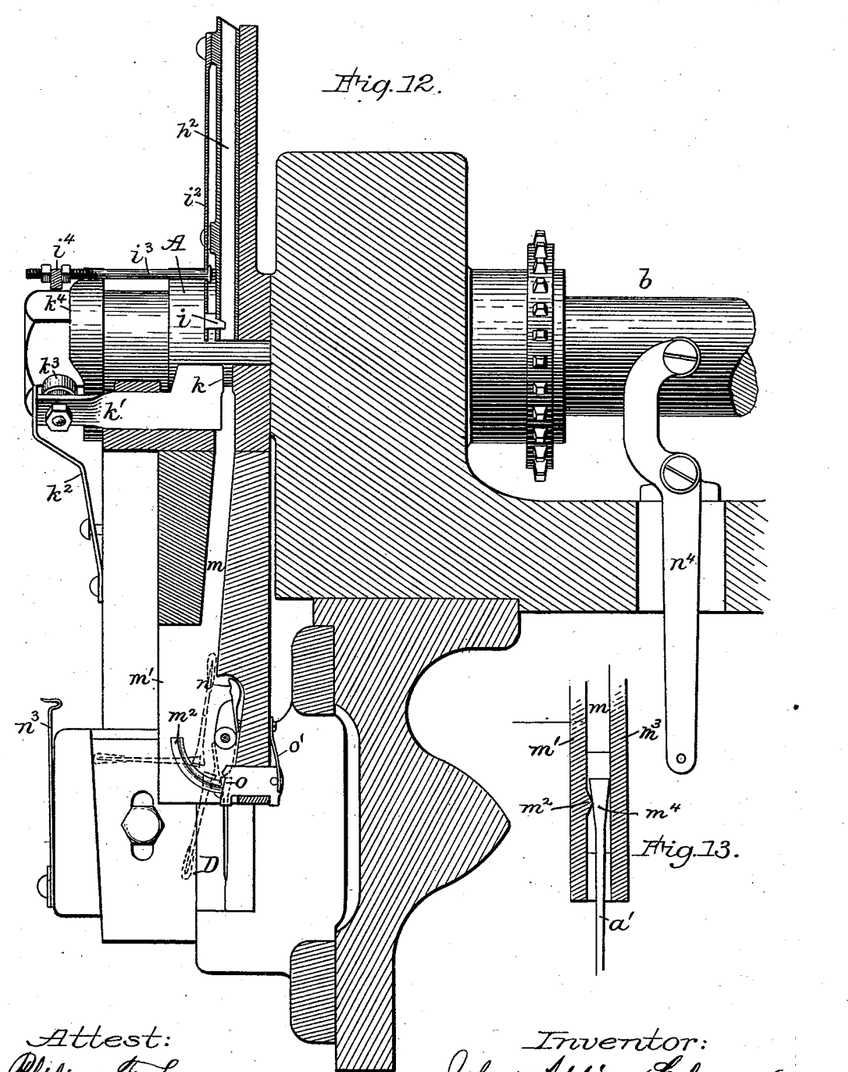
Fig. 12, illustrates said lower portion of the machine partially in central vertical section.
Fig. 13, illustrates a webbed nail supported in a pendent position adjacent to the front of the trimming die, the adjacent portions of the machine being shown in section.

As a blank is delivered head first from the rolls, its head has a tendency to depart from a right line, resulting in a curved shank, and to avoid this, I employ a knife guide $k$, clearly shown in Figs. 10 and 12. This knife guide has a shank $k'$, sliding longitudinally, and the inner end or edge of the knife is closely adjacent to the points of closest contact, between the rolls. The outer end of the shank $k'$, is secured to a powerful spring $k^2$, and provided with a roller $k^3$, which is intermittingly engaged by a cam $k^4$, on the end of one of the roll shafts. On emerging from the rolls, one edge of the head of the blank is centrally engaged by the vertical edge of the knife guide, thus slightly scoring the blank head, and confining it in its descent to a right line, and when the head has passed the guide, the latter is retracted by the cam $k^4$.

All of the mechanism thus far described, may be employed in machines for producing webbed blanks $a'$, whether the webs $a^2$, are to be removed by separate point trimming machines, or by such trimming dies as have been heretofore employed immediately below the terminal dies.

As hereinbefore stated, all prior point-trimming dies have been organized to operate upon the blanks in a vertical position and head downward, as when delivered from the rolls. I have as hereinbefore indicated now for the first time organized said dies, so as to operate on the blanks with the webbed ends downward, and suspended by their heads. In order to accomplish this novel mode of operation, and to secure the valuable results attendant thereon, I have not only reversed the arrangement of the die, and its plunger, but I have devised and combined therewith, intermediate mechanism for receiving each blank, head first, then turning it endwise, supporting it by its head, and presenting it accurately to the die and plunger, so that the detached webs $a^2$, Fig. 4, are prevented from doing any harm to the machine.

The die D, and its plunger D', are both as heretofore, so far as relates to their general form and co-operation for point trimming, but the die is mounted with its head receiving portion uppermost, and the point trimming edge $l$, of the plunger, is at its lower edge.

The plunger is carried by a cross head, operated by an eccentric on a driving shaft, from which power is communicated by gearing and sprocket chains, to other portions of the machine, as clearly indicated in the drawings.

The die D, is suitably clamped at the foot of a chute or pocket $m$, into which the blanks are delivered singly by the rolls, its upper end being of such sectional area and dimension, that a webbed blank can freely fall substantially vertically therein, and without changing its axial position; but the lower end of said chute or pocket, is enlarged toward the front. Near the foot of this enlarged portion, on the side $m'$, thereof, there is a projecting rib $m^2$, partially curved upwardly and partially horizontal, and it is parallel with the face of the die D, the lower portion or end of the rib terminating opposite the head receiving portion of the die, the adjacent side or wall of the chute, having an opening therein, which registers with the said upper, or head portion of said die. Between the other wall $m^3$, of the foot of the chute, and the edge of said rib, there is a space $m^4$, a little wider than the thickness of the shank of a blank, so that when a webbed blank drops head first upon the rib, its webbed end or shank, swings outwardly, edgewise, and falls into the space $m^4$, thus leaving it suspended by its head, on the rib $m^2$, the variable progress and the pendent position being indicated by a webbed blank shown in dotted lines in Fig. 12. Although the blank will generally thus freely turn end for end, and assume its properly supported pendent position on the rib, it is advisable to more positively control it, and this can be done, by means of one of a pair of jaws which clamp the blank by its head, and move it opposite to the opening in the die.

As shown in Fig. 12, two jaws $n$ and $o$ cooperate for moving a suspended blank to, and holding it in front of the die D. The jaw $n$, in this instance, also assures the complete swinging movement of the blank, because it is a pivoted arm, standing normally in a vertical position, and at the proper movement, it is swung on its axis to a pendent position, so that its jaw face, will be opposite the face of the jaw $o$.

Figure 11:
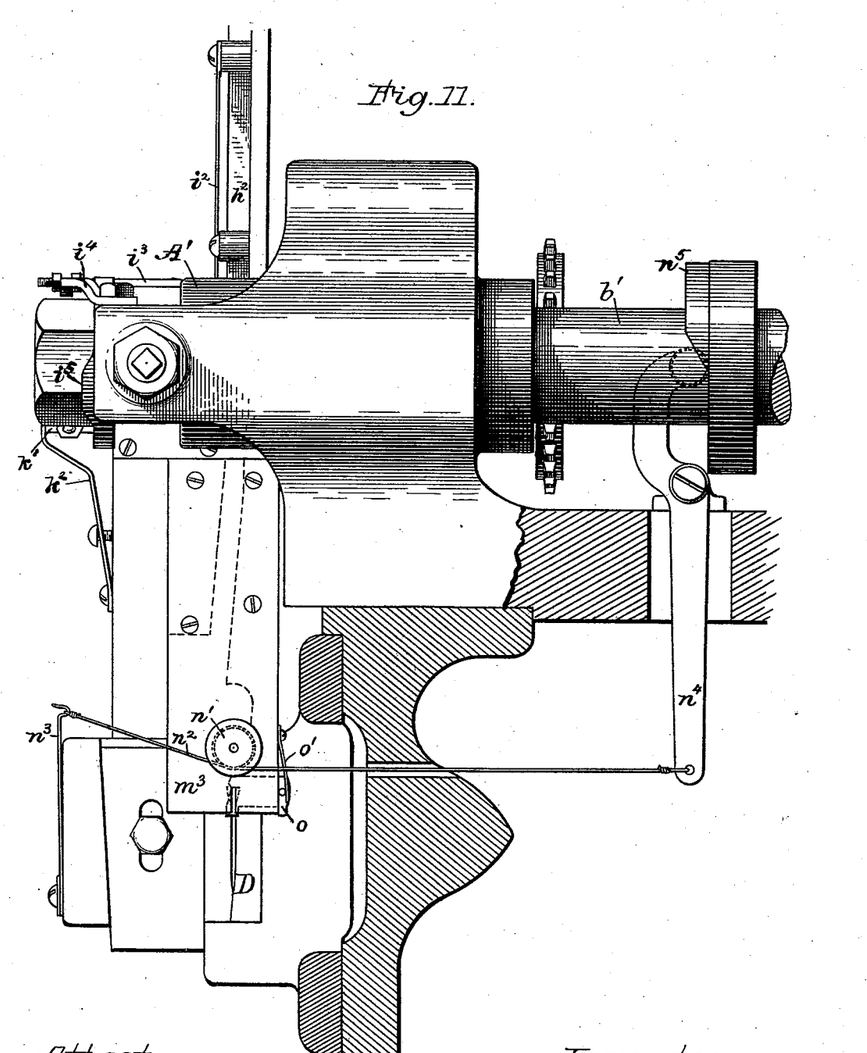
Fig. 11, illustrates the parts shown in Fig. 9, in side view.

The movements of the jaw $n$, are secured by means of a drum $n'$, on the outer end of the jaw axis or shaft, encircled by a well-secured suitable band $n^2$, which at its ends is secured to a spring $n^3$, and to a lever $n^4$, which is vibrated by a cam $n^5$, on one of the roll shafts, all as clearly indicated in Figs. 10, 11 and 12.

The jaw $o$, is a slide, which moves horizontally, and its face normally occupies a position at the one side of the opening at the end of the rib, which registers with the head portion of the die D, and it is held in that position by a spring $o'$; but when the jaw $n$, sweeps downward against one edge of the head of a blank, and carries the other edge of the head against the face of the jaw $o$, a further movement, carries the head thus grasped by the jaws, to its proper position in front of the die.

The face of the plunger D', does not conform to the head portion of the die, and hence the wall $m^3$, of the chute or pocket $m$, has a simple slot opposite the said head portion of the die, as shown in Fig. 11, so that the upper portion of the plunger engages centrally with the side of the head, and simply pushes it inward from the jaws, to and through the die, meantime cutting the web from the blank, and for the first time, said detached web is rendered absolutely harmless, because it can not thereafter possibly get between the plunger, and a blank, in position for the point trimming operation.

My point trimming mechanism is obviously not dependent upon its being always organized immediately below the terminal rolls, or even in the same machine, because after the webbed blanks have been produced, they can be fed by hand to point trimming dies, which are provided with the chute or pocket, the rib, and the two jaws, in accordance with this portion of my invention. It is not absolutely always essential, that both of these jaws should be movable, because when a blank is held by its head upon a horizontal portion of a rib, the movable jaw, can, after once engaging with one edge of the head of a blank, carry the latter by a rapid movement, into contact with the face of a stationary jaw, but the best results will accrue when both jaws are movable.

Figures 14, 15:
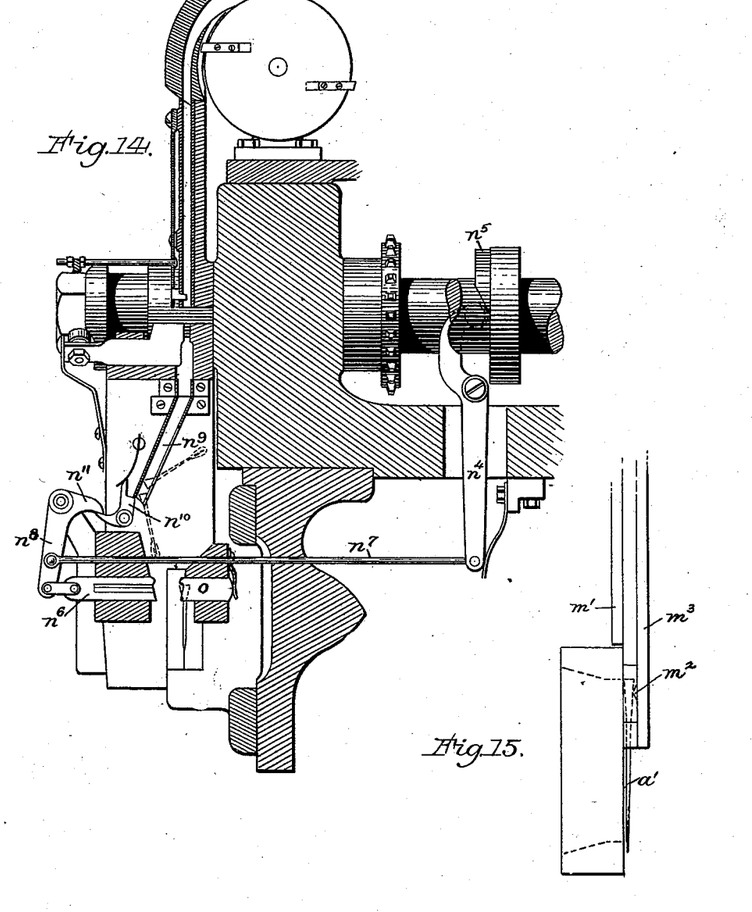
Figs. 14, 15, 16, 17, and 18, illustrate modifications of the mechanism for endwise reversing a blank, between the terminal rolls, and the point trimming die.
Figure 16:
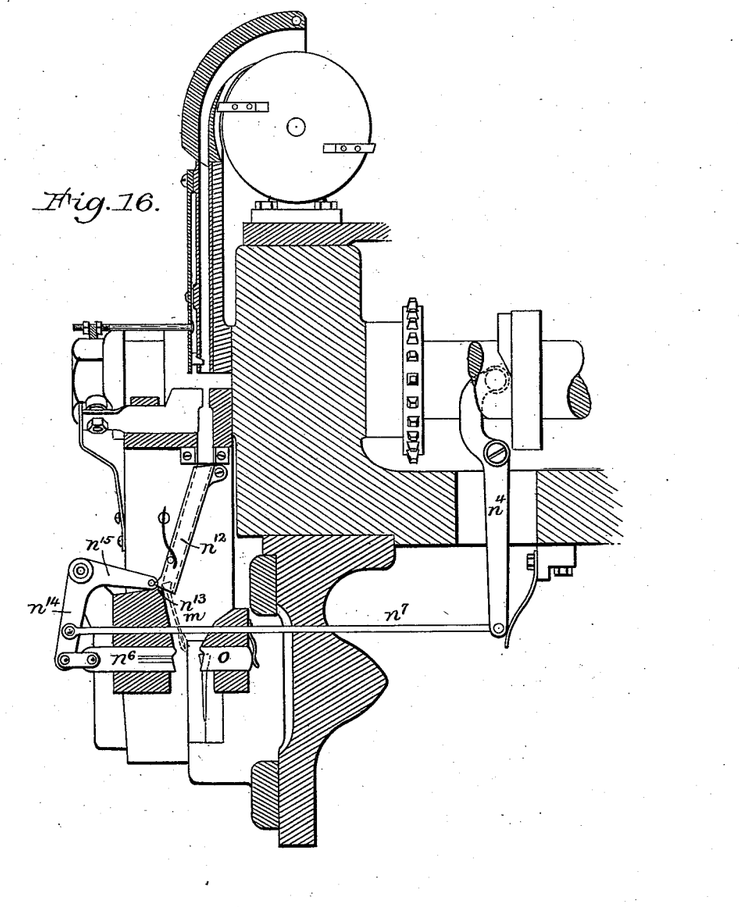
Figure 17:
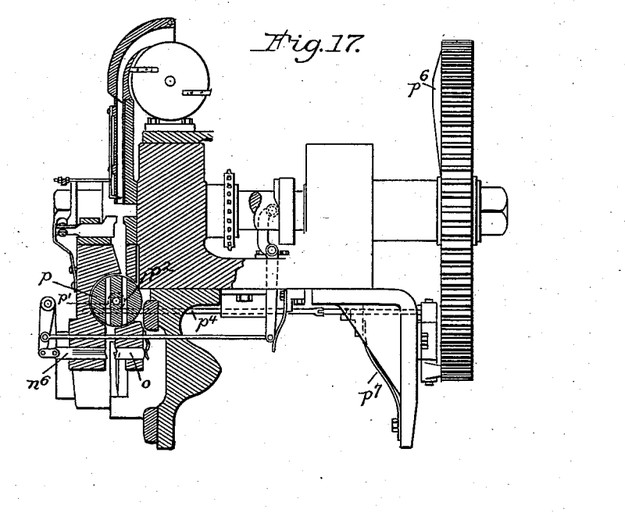
Figure 18:
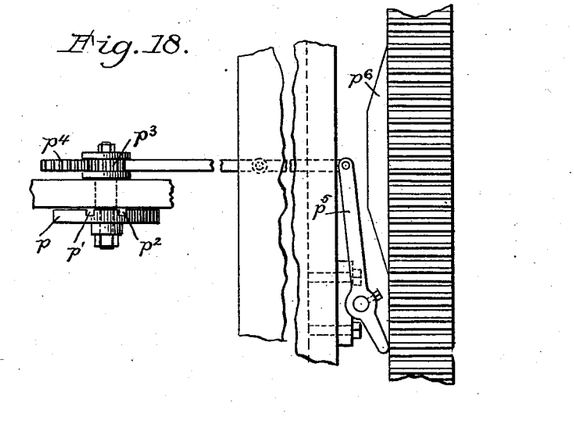

While I prefer the swinging jaw, it is to be understood that I do not restrict myself thereto, because the die and plunger arranged as described, and a head supporting rib, and a sliding jaw, can be successfully employed in connection with various means for endwise reversing the webbed blanks, after they leave the terminal rolls, as, for instance, as shown in Figs. 14 and 15, wherein the sliding jaw $o$, is as before described. A short horizontal rib $m^2$, is also employed, which is on the outer plate $m^3$, and corresponds fully with the lower end of the curved rib before described. Instead of a swinging jaw, its substitute $n^6$, slides horizontally, and is actuated as before described, by a lever $n^4$, and cam $n^5$. In this case, however, said lever is coupled by a rod $n^7$, to a pendent lever $n^8$, to the lower end of which the sliding jaw $n^6$, is linked. A blank on falling head-wise from the rolls, enters an inclined tube $n^9$, which is slotted on its lower side, so that the webbed shank of the blank can swing, and fall freely from the tube, without releasing the head, thus suspending the blank substantially, over the rib $m^2$. The lower end of the tube, is normally closed by a spring stop $n^{10}$, which at the proper moment is tripped by a finger $n^{11}$, on the upper end of the lever $n^8$, so that the blank is dropped to, and is supported by its head on the rib, just before the face of the jaw $n^6$, engages therewith, for carrying the blank opposite the opening in the die. I have also successfully employed a swinging slotted tube, as illustrated in Fig. 16, wherein the jaw $o$, and sliding jaw $n^6$, are as before described, but in this instance, the slotted tube $n^{12}$, is pivoted at its upper end, and is normally controlled by a spring, so that the foot of the tube is held over a stationary stop abutment at $n^{13}$, for preventing a blank from leaving the tube, after it has assumed a practically pendent position, until the tube is slightly deflected, by a bell crank lever with arms $n^{14}$ and $n^{15}$, the lower arm of which, is engaged by the rod $n^7$, and coupled to the sliding jaw $n^6$. It will be seen that the lower portion of the chute or pocket $m$, as previously described, is in substance a slotted tube, in so far as a nail blank cannot turn axially therein, while being free to swing its shank edgewise in one direction, and thence to hang downwardly, and that when thus reversed, it is held by its head on the rib, until removed therefrom. I have still further successfully applied a reversing disk, as a substitute for the slotted tubes, as illustrated in Figs. 17 and 18. In this organization, the jaws $o$, and $n^6$, and the head supporting rib, are as already described.

The reversing disk $p$, located below the rolls, has two parallel blank receiving holes or pockets $p'$, $p^2$, one of which is always ready to receive a blank, head first from the rolls. After a blank has been dropped to the reversing disk, the latter is half rotated and discharges the blank, webbed end downward, to the rib, and the jaws, the other pocket of the disk being then in position for receiving the next blank. This intermitting movement of the disk, is effected by means of a ratcheted gear $p^3$, on one end of the shaft of the disk, which is rotated to and fro by a rack bar $p^4$, secured to a lever $p^5$, actuated in one direction by a cam $p^6$, on one of the roll shaft gears, and in the opposite direction, by a spring $p^7$.

It will be seen, that however the blank may be turned, or caused to be turned, end for end, after leaving the terminal rolls, the jaw $o$, whether movable or stationary, and the rib $m^2$, are essential features, whether the co-operating jaw performs the one function, as when it slides, or has a double function, as when it swings its face downward for assuring the turning of a blank, preparatory to clamping a blank head.

It will also be seen, that it is immaterial on which side of the pocket or chute $m$, the rib $m^2$, may be supported or located, provided the space $m^4$, be afforded between the edge of the rib, and the surface of either, the wall or side $m'$, or the side $m^3$, both arrangements being shown respectively in Figs. 13 and 15.

During the gravity movements of the blanks in the feed tubes generally, and between the terminal rolls, and the trimming dies, I find it desirable to employ forced air for accelerating the movements of the blanks, especially after they have been held at rest, and have but a short distance to fall.

Having thus described my invention, I claim as new and desire to secure by Letters Patent—

1. In a machine for making horse shoe nails, the combination substantially as hereinbefore described, of a feed tube, a raceway composed of rotative parallel rods, driven in opposite directions, and diving fingers at one end of the raceway, whereby nail blanks deposited upon one end of said raceway will be carried thereon in a pendent position by their heads to the foot of the incline, and from thence be lifted by the diving fingers, and delivered head first to the feed tube.

2. In a machine for making horse shoe nails, the combination substantially as hereinbefore described, of a raceway composed of parallel rotated rods or bars, separated by a space less than the thickness of the head of a nail blank, but closed in its lower end to the outward passage of nails or blanks, a hopper or receptacle for receiving nail blanks in mass, and separating mechanism for detaching and lifting nails from the mass and delivering them singly upon the raceway, the latter holding said blanks in a pendent position and causing them to move to the end of the raceway.

3. In a machine for making horse shoe nails the combination substantially as hereinbefore described, of a pan or receptacle for receiving nail blanks in mass, a vertically reciprocating separator within said pan, and provided with a grooved inclined upper edge for picking up blanks sidewise, a raceway for holding blanks by their heads, and a V-shaped trough between said separator and said raceway, whereby blanks lifted by the separator, will slide endwise longitudinally therefrom into the trough, and from thence to the raceway, and thereon assume a vertical pendent position.

4. In a machine for making horse shoe nails, the combination substantially as hereinbefore described, of a receptacle for nail blanks in mass, a vertically reciprocating separator provided with a shallow groove at its top within said receptacle, a raceway composed of parallel rotative rods separated by a space less than the thickness of the heads of the blanks, and a V-shaped chute between said separator and raceway.

5. In a machine for making horse shoe nails, the combination substantially as hereinbefore described, of a feed tube, a raceway composed of parallel rotative rods, pointed at their ends, and separated by a space less than the thickness of a nail blank head, a vertical stop or finger at the discharging end of the raceway for preventing the passage of blanks beyond the pointed ends of said rods, and diving fingers which engage with the head of each blank held by said stop or finger, and lift it from the raceway, and deliver it head first to the feed tube.

6. In a machine for making horse shoe nails, the combination with die rolls, of a reciprocating knife guide, located between said rolls and provided with a guiding edge which forcibly engages with the middle of the edge of a blank head as it leaves the roll, and a cam and a spring for imparting its reciprocating movements, whereby the blank as it emerges from the rolls is restricted to a right line movement.

7. The combination substantially as hereinbefore described, a pair of die rolls, which develop webbed nail blanks and discharge them head downward; a point trimming die, and its plunger, for cutting the webs from blanks in a vertical position with their heads upward, and a blank reverser, and an automatically operated blank head clamp, substantially as described between said rolls and the die, which respectively, separately and individually controls each blank, and directly reverses it endwise, and suspends it by its head, and delivers it to the die.

8. The combination substantially as hereinbefore described, of a nail point trimming die, having its head receiving portion above the point trimming portion, a plunger co-operating therewith, a rib parallel with the face of the die, and co-operating with an adjacent surface for holding nail blanks in a pendent position, and jaws for clamping a blank edgewise at its head and holding it during the operation of the die and plunger.

9. The combination substantially as hereinbefore described, of a nail point trimming die and its plunger, cooperating to cut a web from the point of a blank in a pendent position, a rib for supporting a webbed blank by its head parallel with the face of the die, and a pair of jaws which grasp the blank edgewise at its head, and move the blank to, and maintain it in a pendent position in front of the die and in line with the plunger.

10. The combination with a pair of die rolls which develop a nail blank having a web at and adjacent to the rolled point of the nail, of a point trimming die, and its plunger for operating on blanks head upward and in a pendent position; a chute or pocket below the rolls and between them and the die; a rib in said chute for supporting each blank by its head; and a pair of jaws by which the head of a blank is grasped edgewise and carried in a pendent position opposite the die, and in line with the plunger.

11. The combination substantially as hereinbefore described, of a chute or pocket for receiving nail blanks which require the removal of a web for developing the points; a curved rib in said pocket which stops the fall of a blank, permits it to swing into a pendent position and holds it by its head; a pivoted jaw which swings along said rib; a sliding jaw; and a point trimming die and its plunger, which cut the webs from blanks standing head upward, said swinging jaw serving to assure the pendent position of each blank, and both of them co-operating to grasp a blank head edgewise and to carry the pendent blank in front of the die, and in line with the plunger.

JOHN ADDISON COLEMAN.

Witnesses:
C. M. VAN SLYCK,
CLINTON D. SELLEW.